(12) United States Patent
Yakumaru

(10) Patent No.: US 9,985,302 B2
(45) Date of Patent: May 29, 2018

(54) FUEL CELL SYSTEM

(71) Applicant: Panasonic Corporation, Osaka (JP)

(72) Inventor: Yuuichi Yakumaru, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 190 days.

(21) Appl. No.: 14/642,971

(22) Filed: Mar. 10, 2015

(65) Prior Publication Data

US 2015/0263362 A1 Sep. 17, 2015

(30) Foreign Application Priority Data

Mar. 17, 2014 (JP) ................................ 2014-053260

(51) Int. Cl.
| | |
|---|---|
| *H01M 8/04014* | (2016.01) |
| *H01M 8/0662* | (2016.01) |
| *H01M 8/04089* | (2016.01) |
| *H01M 8/12* | (2016.01) |
| *H01M 8/02* | (2016.01) |

(Continued)

(52) U.S. Cl.
CPC ......... *H01M 8/04014* (2013.01); *H01M 8/02* (2013.01); *H01M 8/04022* (2013.01); *H01M 8/04052* (2013.01); *H01M 8/04097* (2013.01); *H01M 8/0675* (2013.01); *H01M 8/12* (2013.01); *H01M 8/0618* (2013.01); *H01M 8/0637* (2013.01); *H01M 8/2475* (2013.01); *H01M 2008/1293* (2013.01); *H01M 2300/0074* (2013.01); *Y02E 60/566* (2013.01)

(58) Field of Classification Search
None
See application file for complete search history.

(56) References Cited

U.S. PATENT DOCUMENTS 3,655,448 A * 4/1972 Setzer ................. H01M 8/0612
429/410
5,573,867 A * 11/1996 Zafred .............. H01M 8/04089
429/410

(Continued)

FOREIGN PATENT DOCUMENTS

| JP | 2010-277843 | 12/2010 |
| JP | 2010-277844 | 12/2010 |

(Continued)

OTHER PUBLICATIONS

The Extended European Search Report dated Aug. 4, 2015 for the related European Patent Application No. 15157761.6.

*Primary Examiner* — Maria Laios
(74) *Attorney, Agent, or Firm* — McDermott Will & Emery LLP

(57) ABSTRACT

A fuel cell system includes a hydro-desulfurizer that removes sulfur compounds in power generation material, a fuel cell unit that generates electric power using the power generation material, a recycle channel that supplies a part of hydrogen-containing gas from the fuel cell unit to the power generation material before the power generation material enters the hydro-desulfurizer, and an ejector which is provided in a power generation material channel upstream of the hydro-desulfurizer and into which hydrogen-containing gas from the recycle channel flows, in which the ejector is heated by exhaust gas discharged from the fuel cell unit.

6 Claims, 6 Drawing Sheets

(51) Int. Cl.
  *H01M 8/04007*  (2016.01)
  *H01M 8/124*    (2016.01)
  *H01M 8/0612*   (2016.01)
  *H01M 8/0637*   (2016.01)
  *H01M 8/2475*   (2016.01)

(56) References Cited

U.S. PATENT DOCUMENTS

| 7,332,003 | B1* | 2/2008 | Li ............................ C01B 3/386 |
| | | | 422/198 |
| 2004/0062973 | A1* | 4/2004 | Agnew ............. H01M 8/04022 |
| | | | 429/423 |
| 2010/0304235 | A1 | 12/2010 | Shigezumi et al. |
| 2010/0304241 | A1 | 12/2010 | Ooe et al. |

FOREIGN PATENT DOCUMENTS

| JP | 2011-216308 | 10/2011 |
| JP | 2013-222573 | 10/2013 |

* cited by examiner

FUEL CELL SYSTEM

BACKGROUND

1. Technical Field

The present disclosure relates to a fuel cell system.

2. Description of the Related Art

A fuel cell system can derive electric energy with high efficiency by way of reaction of hydrogen-containing gas produced by reforming power generation material and oxygen in the air acting as oxidant. Since a catalyst used for reforming the power generation material decreases in activity when poisoned with sulfur, sulfur compounds in the power generation material need to be removed before reformation. Sulfur compounds can be removed by hydro-desulfurization in which hydrogen is mixed with the power generation material, for example.

A fuel cell system typically feeds a part of hydrogen-containing gas resulting from reformation of the power generation material back to the power generation material channel as the source of hydrogen to be mixed with the power generation material. For this purpose, a pressure feeder such as a blower may be provided in a recycle channel, or an orifice or the like may be provided upstream of the junction of the power generation material channel and the recycle channel for adjusting pressure balance such that the pressure of hydrogen-containing gas becomes higher than the pressure in the junction.

A fuel cell system can encounter the problem of condensed water being fed to a power generation material feeder that feeds power generation material as a result of condensation of water vapor in hydrogen-containing gas from the recycle channel, or the problem of a gas channel being blocked by condensed water.

As a solution to these problems, Japanese Unexamined Patent Application Publication No. 2013-222573 proposes a method in which an ejector is provided between the power generation material feeder and the hydro-desulfurizer in a fuel cell system so that hydrogen-containing gas is suctioned into the ejector. This can prevent condensed water in the hydrogen-containing gas flowing in the recycle channel from entering the power generation material feeder.

SUMMARY

Conventional arts, however, do not sufficiently address the problem of the ejector being blocked by condensed water in hydrogen-containing gas from the recycle channel.

One non-limiting and exemplary embodiment provides a fuel cell system that can reduce the possibility of an ejector being blocked by condensed water in hydrogen-containing gas from a recycle channel compared to conventional arts.

In one general aspect, the techniques disclosed here feature a fuel cell system including a hydro-desulfurizer that removes sulfur compounds in power generation material, a fuel cell unit that generates electric power using the power generation material, a recycle channel that supplies a part of hydrogen-containing gas from the fuel cell unit to the power generation material before the power generation material enters the hydro-desulfurizer, and an ejector which is provided in a power generation material channel upstream of the hydro-desulfurizer and into which hydrogen-containing gas from the recycle channel flows, in which the ejector is heated by exhaust gas discharged from the fuel cell unit.

The fuel cell system according to an aspect of the present disclosure can reduce the possibility of the ejector being blocked by condensed water in hydrogen-containing gas from the recycle channel compared to conventional arts.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
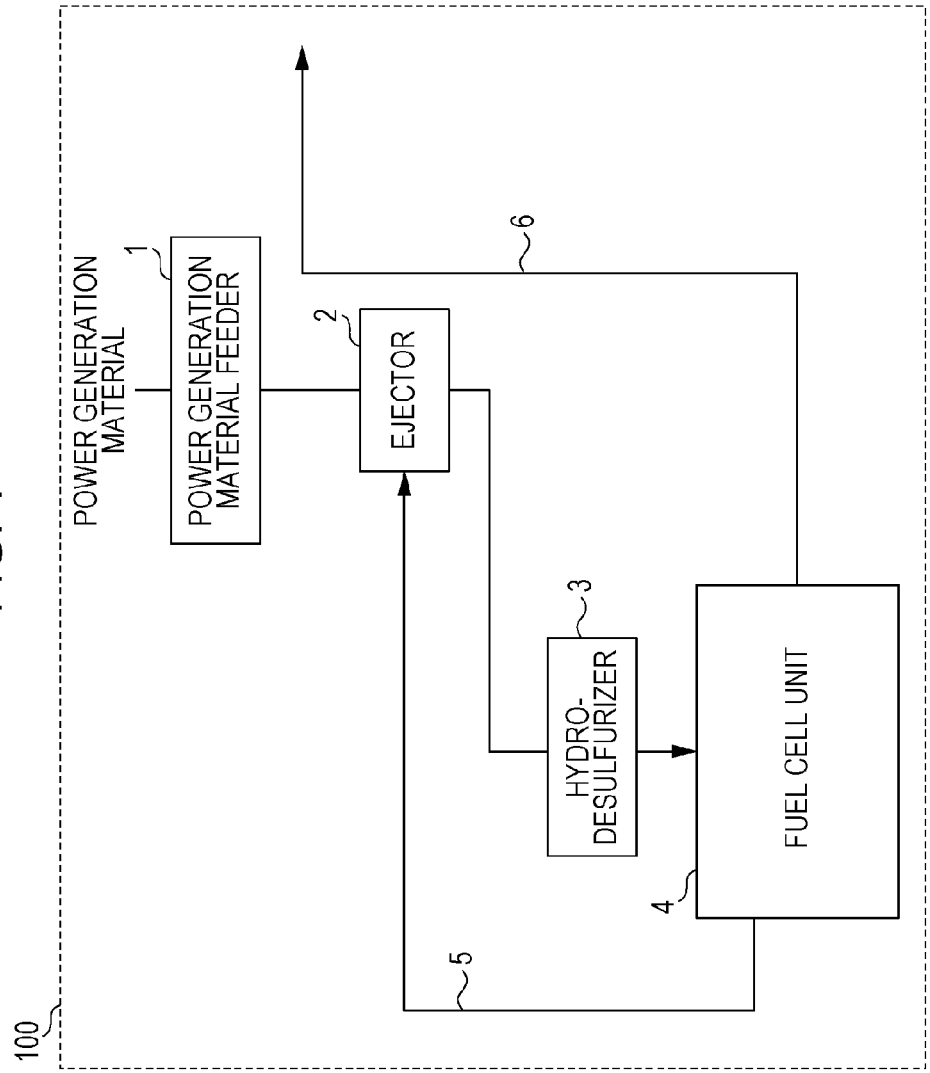
FIG. 1 illustrates an example of the fuel cell system according to a first embodiment.

The present inventor has obtained the following findings after researching into the problem of the ejector being blocked by condensed water in hydrogen-containing gas from the recycle channel.

Hydrogen-containing gas flowing in the recycle channel contains water vapor and produces condensed water upon being cooled. For example, when hydrogen-containing gas is cooled by heat dissipation, condensed water is generated from the hydrogen-containing gas. Hydrogen-containing gas also produces condensed water when it is cooled by being mixed with power generation material of a lower temperature than that of the hydrogen-containing gas. Such condensed water can potentially block the ejector.

A first aspect of the present disclosure therefore provides a fuel cell system including a hydro-desulfurizer that removes sulfur compounds in power generation material, a fuel cell unit that generates electric power using the power generation material, a recycle channel that supplies a part of hydrogen-containing gas from the fuel cell unit to the power generation material before the power generation material enters the hydro-desulfurizer, and an ejector which is provided in a power generation material channel upstream of the hydro-desulfurizer and into which hydrogen-containing gas from the recycle channel flows, in which the ejector is heated by exhaust gas discharged from the fuel cell unit.

In this arrangement, the amount of condensed water in the ejector can be reduced because the ejector is heated by exhaust gas from the fuel cell unit. Compared to conventional arts, the possibility of the ejector being blocked by condensed water in hydrogen-containing gas from the recycle channel can be reduced.

A second aspect of the present disclosure is the fuel cell system according to the first aspect, in which the hydro-desulfurizer is heated by the exhaust gas.

In this arrangement, the amount of condensed water in the hydro-desulfurizer can be reduced because the hydro-desulfurizer is heated by exhaust gas, which in turn can reduce the possibility of decrease in performance of the hydro-desulfurization catalyst due to condensed water or the possibility of a channel blockage in the hydro-desulfurizer.

A third aspect of the present disclosure is the fuel cell system according to the first aspect, further including a first container that houses the fuel cell unit and a second container that houses the ejector, in which the second container has an inlet port through which exhaust gas from the fuel cell unit discharged from the first container enters the second container and an outlet port through which exhaust gas exits the second container, and in which the ejector is heated by the exhaust gas flowing between the inlet port and the outlet port.

In this arrangement, since the second container forms a flowing route for exhaust gas between the inlet port and the outlet port, placement of the ejector in the second container facilitates heating of the ejector with exhaust gas. The ejector can therefore be effectively heated.

A fourth aspect of the present disclosure is the fuel cell system according to the third aspect, in which the hydro-desulfurizer is heated by the exhaust gas flowing between the inlet port and the outlet port.

In this arrangement, since the second container forms a flowing route for exhaust gas between the inlet port and the outlet port, placement of the hydro-desulfurizer in the second container facilitates heating of the hydro-desulfurizer with exhaust gas. The hydro-desulfurizer can therefore be effectively heated.

A fifth aspect of the present disclosure is the fuel cell system according to the second or fourth aspect, in which the hydro-desulfurizer is heated by the exhaust gas earlier than the ejector.

The temperature appropriate for hydrogenation reaction in the hydro-desulfurizer is higher than the temperature required for decreasing the amount of condensed water in hydrogen-containing gas in the ejector. Thus, by heating the hydro-desulfurizer with exhaust gas earlier than the ejector, the temperature in the hydro-desulfurizer can be appropriately increased while decreasing the amount of condensed water in the ejector.

A sixth aspect of the present disclosure is the fuel cell system according to the fourth aspect, in which the hydro-desulfurizer is placed closer to the inlet port than the ejector is.

In this arrangement, the temperature appropriate for hydrogenation reaction in the hydro-desulfurizer is higher than the temperature required for decreasing the amount of condensed water in hydrogen-containing gas in the ejector. As exhaust gas of high temperature from the fuel cell unit enters the second container from the inlet port of the second container, placing the hydro-desulfurizer closer to the inlet port of the second container than the ejector is to the inlet port enables the temperature in the hydro-desulfurizer to be appropriately increased while decreasing the amount of condensed water in the ejector.

A seventh aspect of the present disclosure is the fuel cell system according to any one of the first through sixth aspects, in which the fuel cell unit includes solid oxide fuel cells, a combustor that combusts anode off-gas discharged from the solid oxide fuel cells, and a casing that houses the solid oxide fuel cells and the combustor.

An eighth aspect of the present disclosure is the fuel cell system according to any one of the first through seventh aspects, in which the first container and the second container are rectangular parallelepipeds and disposed adjacent to each other, and in which the recycle channel extends from the first container into the second container via adjacent surfaces of the first container and the second container.

In this arrangement, since the recycle channel extends from the first container into the second container with little contact with outside air, heat dissipation in the recycle channel is suppressed, which in turn reduces water condensation in the recycle channel.

(First Embodiment)
[Device Structure]

FIG. 1 illustrates an example of the fuel cell system in the first embodiment.

As illustrated in FIG. 1, a fuel cell system 100 in this embodiment includes a power generation material feeder 1, an ejector 2, a hydro-desulfurizer 3, a fuel cell unit 4, and a recycle channel 5.

The power generation material feeder 1 delivers power generation material. For example, for delivery of power generation material, the power generation material feeder 1 is used to increase the pressure of the power generation material. The power generation material feeder 1 may be any mechanism that can deliver power generation material. The power generation material feeder 1 may be a blower or a diaphragm pump, for example. The power generation material contains an organic compound composed at least of carbon and hydrogen. The power generation material may be town gas, natural gas, LP gas, or vaporized liquid fuel such as alcohol, kerosene, and gasoline, for instance. The power generation material is supplied from a power generation material source. The power generation material source has a certain supply pressure, and may be a power generation material cylinder or power generation material infrastructure, for example.

The hydro-desulfurizer 3 removes sulfur compounds in the power generation material. The hydro-desulfurizer 3 is formed of a container filled with hydro-desulfurizing agent. The hydro-desulfurizing agent may be a Cu—Zn catalyst that has both the function of converting sulfur compounds to hydrogen sulfide and the function of absorbing hydrogen sulfide, for example. The hydro-desulfurizing agent is not limited to this example; it may be composed of a Co—Mo catalyst that converts sulfur compounds in the power generation material gas to hydrogen sulfide and a ZnO catalyst or Cu—Zn catalyst provided downstream of it as a sulfur absorbent for absorbing and removing hydrogen sulfide.

The fuel cell unit 4 generates electric power using the power generation material. The fuel cell unit 4 includes at least fuel cells and may optionally include a reformer for generating hydrogen-containing gas through reforming reaction using the power generation material. When the fuel cell unit 4 does not include a reformer, hydrogen-containing gas is produced in the fuel cells through reforming reaction. An example of this type of fuel cell is an internal reforming solid oxide fuel cell.

Reforming reaction in the fuel cell unit 4 may be of any type, such as steam reforming reaction, autothermal reaction, and partial oxidation reaction, for example. Although not shown in FIG. 1, devices necessary for the type of reforming reaction being used are provided. For example, in the case of steam reforming reaction, an evaporator for generating water vapor, a water feeder for supplying water to the evaporator, and the like are provided. In the case of autothermal reaction, an air supply for supplying air is additionally provided. The fuel cells in the fuel cell unit 4 may be of any type, such as polymer electrolyte fuel cells, solid oxide fuel cells, and phosphoric acid fuel cells, for example.

The recycle channel 5 supplies a part of the hydrogen-containing gas from the fuel cell unit 4 to the ejector 2. By routing a part of hydrogen-containing gas to the recycle channel 5, hydrogen necessary for hydrogenation reaction in the hydro-desulfurizer 3 can be supplied.

The recycle channel 5 may be in any form that enables supply of a part of hydrogen-containing gas from the fuel cell unit 4 to the ejector 2. Hydrogen-containing gas to be supplied to the ejector 2 may be anode off-gas from the fuel cells of the fuel cell unit 4, or if the fuel cell unit 4 includes a reformer, reformed gas from any portion of the gas channel downstream of the reformer, for example, reformed gas downstream of the reformer, reformed gas downstream of a transformer, reformed gas downstream of a CO removal unit, or anode off-gas from the fuel cells.

The ejector 2 is provided downstream of the power generation material feeder 1. The ejector 2 increases the velocity of flow of the power generation material from the power generation material feeder 1 to thereby make the pressure in the power generation material channel in the ejector 2 lower than the pressure at the upstream end of the recycle channel 5 so that the hydrogen-containing gas flowing in the recycle channel 5 is drawn into the ejector 2. For example, the ejector 2 may have a throttle mechanism for decreasing the cross-sectional area of the power generation material channel so as to increase the velocity of flow of the power generation material.

The ejector 2 is also arranged to be heated by exhaust gas from the fuel cell unit 4. Exhaust gas flows through an exhaust gas channel 6. Exhaust gas from the fuel cell unit 4 for heating the ejector 2 may be anode off-gas or cathode off-gas from the fuel cells of the fuel cell unit 4, for example. If the fuel cell unit 4 includes a combustor for combusting anode off-gas, combustion exhaust gas from the combustor may be used as the exhaust gas for heating the ejector 2.

As noted above, hydrogen-containing gas flowing in the recycle channel 5 contains water vapor and produces condensed water upon being cooled. For example, when hydrogen-containing gas is cooled by heat dissipation, condensed water is generated from the hydrogen-containing gas. Hydrogen-containing gas also produces condensed water when it is cooled by being mixed with power generation material of a lower temperature than that of the hydrogen-containing gas. Such condensed water can potentially block the ejector 2.

By heating the ejector 2 with exhaust gas from the fuel cell unit 4, this embodiment can decrease the amount of condensed water in the ejector 2. Thus, the possibility of the ejector 2 being blocked by condensed water in hydrogen-containing gas from the recycle channel 5 can be reduced compared to conventional arts.

Although not shown, the fuel cell system 100 may be equipped with valves and the like for shutting off the power generation material channel or the recycle channel 5 or adjusting the flow rate in the channels as necessary. Also, the ejector 2 may be arranged to be heated by a heating element such as an electrical component or solenoid valve.

(First Variation)
[Device Structure]

Figure 2:
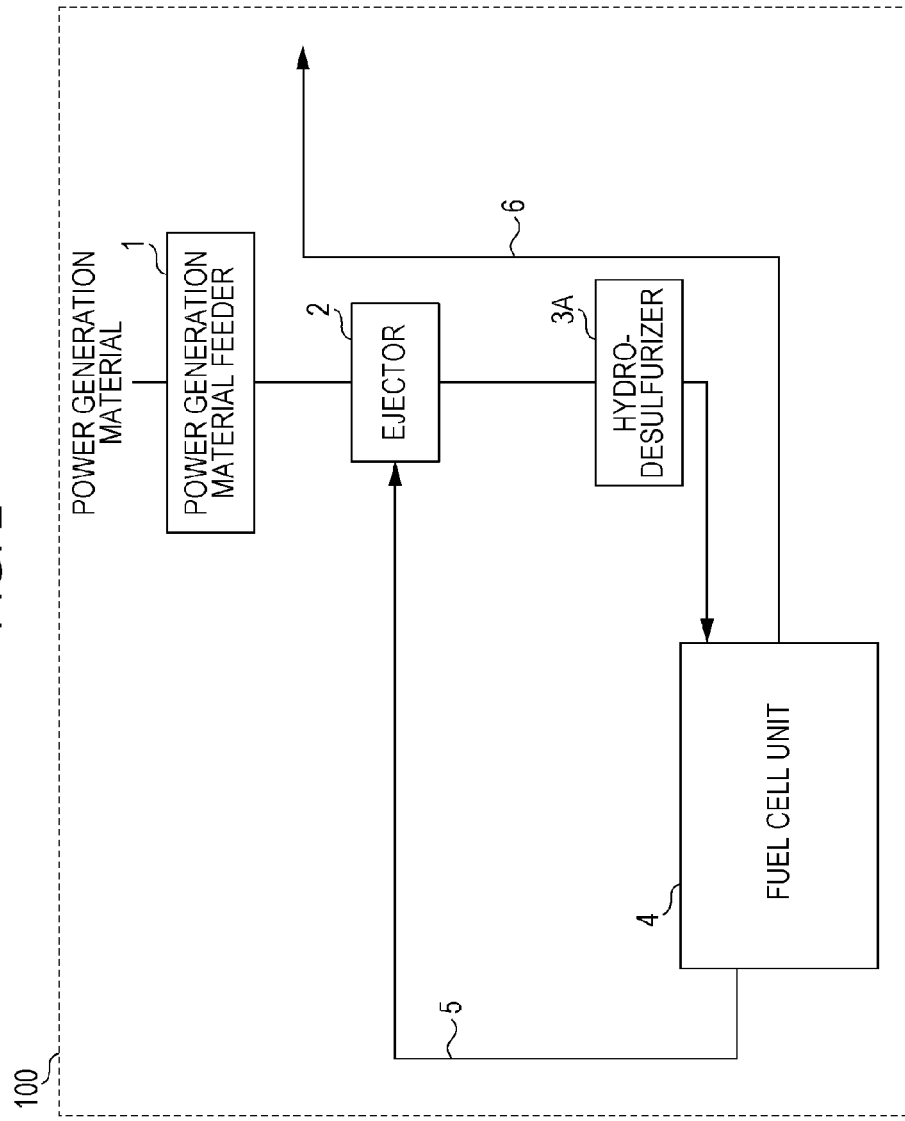
FIG. 2 illustrates an example of the fuel cell system according to a first variation of the first embodiment.

FIG. 2 illustrates an example of the fuel cell system in a first variation of the first embodiment.

As illustrated in FIG. 2, the fuel cell system 100 in this variation includes the power generation material feeder 1, the ejector 2, a hydro-desulfurizer 3A, the fuel cell unit 4, and the recycle channel 5. As the power generation material feeder 1, the ejector 2, the fuel cell unit 4, and the recycle channel 5 are similar to the first embodiment, descriptions of them are omitted.

The hydro-desulfurizer 3A is arranged to be heated by exhaust gas from the fuel cell unit 4.

By heating the hydro-desulfurizer 3A with exhaust gas, the amount of condensed water in the hydro-desulfurizer 3A can be decreased. This can in turn reduce the possibility of decrease in performance of the hydro-desulfurization catalyst due to condensed water or the possibility of a channel blockage in the hydro-desulfurizer 3A.

(Second Variation)
[Device Structure]

The fuel cell system 100 in this variation has a similar structure to FIG. 2; it includes the power generation material feeder 1, the ejector 2, the hydro-desulfurizer 3A, the fuel cell unit 4, and the recycle channel 5. As the power generation material feeder 1, the ejector 2, the fuel cell unit 4, and the recycle channel 5 are similar to the first embodiment, descriptions of them are omitted.

The hydro-desulfurizer 3A is arranged to be heated by exhaust gas earlier than the ejector 2.

The temperature appropriate for hydrogenation reaction in the hydro-desulfurizer 3A is higher than the temperature required for decreasing the amount of condensed water in hydrogen-containing gas in the ejector 2. For example, when a Cu—Zn catalyst is used as the hydro-desulfurizing agent, the temperature range for effective operation of the hydro-desulfurizer 3A is about 150° C. to 350° C. Thus, by heating the hydro-desulfurizer 3A with exhaust gas earlier than the ejector 2, the temperature in the hydro-desulfurizer 3A can be appropriately increased while decreasing the amount of condensed water in the ejector 2.

(Second Embodiment)
[Device Structure]

Figure 3:
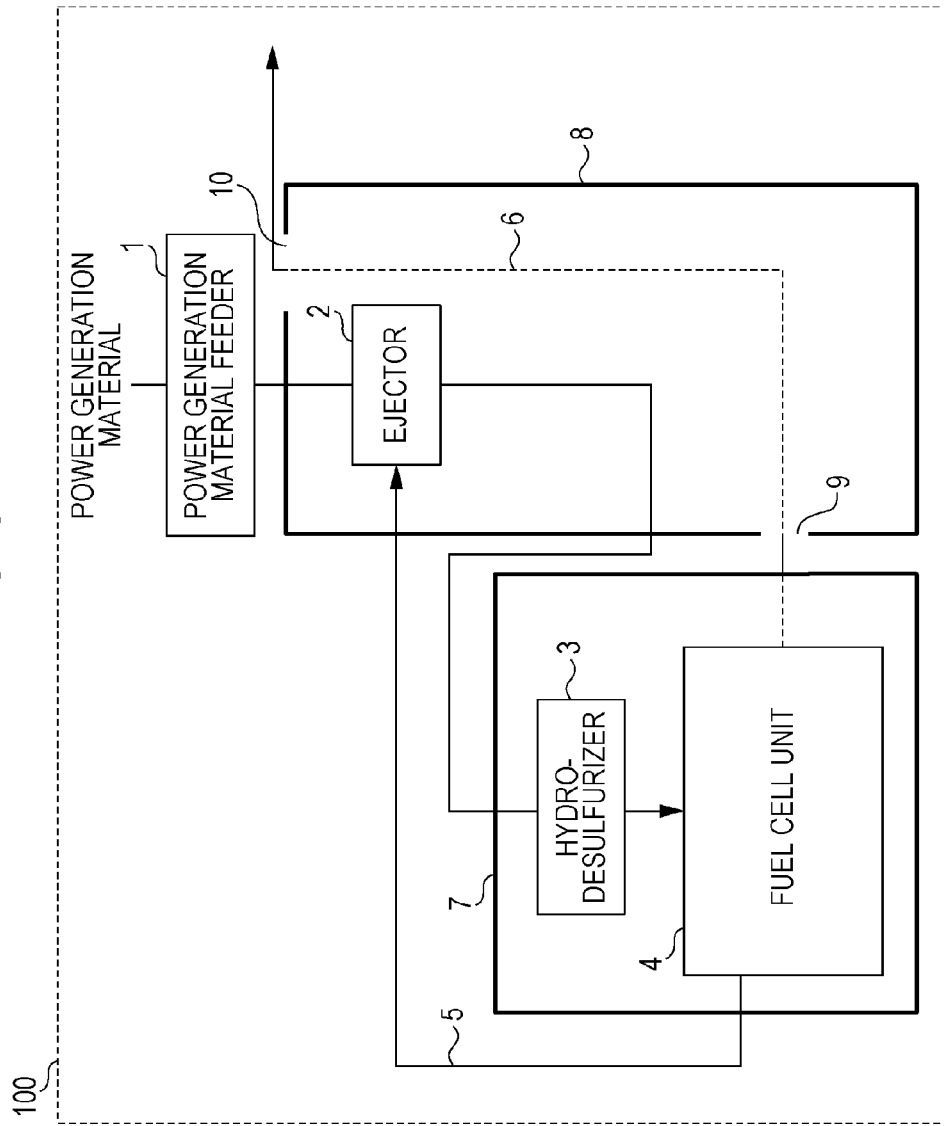
FIG. 3 illustrates an example of the fuel cell system according to a second embodiment.

FIG. 3 illustrates an example of the fuel cell system in a second embodiment.

As illustrated in FIG. 3, the fuel cell system 100 in this embodiment includes the power generation material feeder 1, the ejector 2, the hydro-desulfurizer 3, the fuel cell unit 4, the recycle channel 5, a first container 7, a second container 8, an inlet port 9, and an outlet port 10. As the power generation material feeder 1, the ejector 2, the hydro-desulfurizer 3, the fuel cell unit 4, and the recycle channel 5 are similar to the first embodiment, descriptions of them are omitted.

The first container 7 houses the fuel cell unit 4. In this embodiment, the fuel cell unit 4 and the hydro-desulfurizer 3 are disposed inside the first container 7.

The second container 8 houses the ejector 2. The second container 8 has the inlet port 9 through which exhaust gas from the fuel cell unit 4 discharged from the first container 7 enters the second container 8 and the outlet port 10 through which exhaust gas exits the second container 8, and the ejector 2 is arranged to be heated by the exhaust gas flowing between the inlet port 9 and the outlet port 10. The path on which exhaust gas flows between the inlet port 9 and the outlet port 10 forms a part of the exhaust gas channel 6.

As described above, since the second container 8 forms a flowing route for exhaust gas between the inlet port 9 and the outlet port 10, placement of the ejector 2 in the second container 8 facilitates heating of the ejector 2 with exhaust gas. The ejector 2 can therefore be effectively heated.

(First Variation)
[Device Structure]

Figure 4:
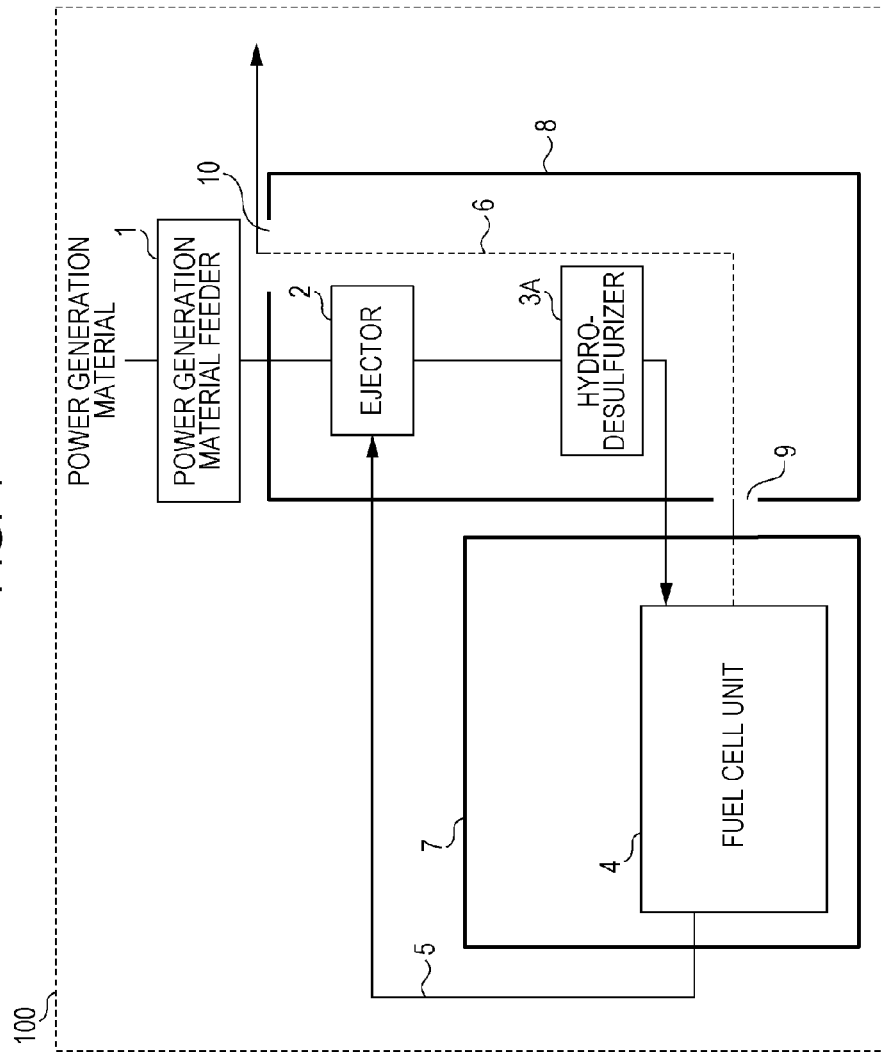
FIG. 4 illustrates an example of the fuel cell system according to a first variation of the second embodiment.

FIG. 4 illustrates an example of the fuel cell system in a first variation of the second embodiment.

As illustrated in FIG. 4, the fuel cell system 100 in this variation includes the power generation material feeder 1, the ejector 2, the hydro-desulfurizer 3A, the fuel cell unit 4, the recycle channel 5, the first container 7, the second container 8, the inlet port 9, and the outlet port 10. As the power generation material feeder 1, the ejector 2, the fuel cell unit 4, the recycle channel 5, the first container 7, the second container 8, the inlet port 9, and the outlet port 10 are similar to the second embodiment, descriptions of them are omitted.

The hydro-desulfurizer 3A is heated by the exhaust gas flowing between the inlet port 9 and the outlet port 10 of the second container 8.

In this variation, the ejector 2 and the hydro-desulfurizer 3A are disposed inside the second container 8.

As described above, since the second container 8 forms a flowing route for exhaust gas between the inlet port 9 and the outlet port 10, placement of the hydro-desulfurizer 3A in the second container 8 facilitates heating of the hydro-desulfurizer 3A with exhaust gas. The hydro-desulfurizer 3A can therefore be effectively heated.

(Second Variation)
[Device Structure]

The fuel cell system 100 in this variation has a similar structure to FIG. 4; it includes the power generation material feeder 1, the ejector 2, the hydro-desulfurizer 3A, the fuel cell unit 4, the recycle channel 5, the first container 7, the second container 8, the inlet port 9, and the outlet port 10. As the power generation material feeder 1, the ejector 2, the fuel cell unit 4, the recycle channel 5, the first container 7, the second container 8, the inlet port 9, and the outlet port 10 are similar to the second embodiment, descriptions of them are omitted.

The hydro-desulfurizer 3A is arranged to be heated by exhaust gas earlier than the ejector 2.

The temperature appropriate for hydrogenation reaction in the hydro-desulfurizer 3A is higher than the temperature required for decreasing the amount of condensed water in hydrogen-containing gas in the ejector 2. For example, when a Cu—Zn catalyst is used as the hydro-desulfurizing agent, the temperature range for effective operation of the hydro-desulfurizer 3A is about 150° C. to 350° C.

Thus, by heating the hydro-desulfurizer 3A with exhaust gas earlier than the ejector 2, the temperature in the hydro-desulfurizer 3A can be appropriately increased while decreasing the amount of condensed water in the ejector 2.

(Third Variation)
[Device Structure]

The fuel cell system 100 in this variation has a similar structure to FIG. 4; it includes the power generation material feeder 1, the ejector 2, the hydro-desulfurizer 3A, the fuel cell unit 4, the recycle channel 5, the first container 7, the second container 8, the inlet port 9, and the outlet port 10. As the power generation material feeder 1, the ejector 2, the fuel cell unit 4, the recycle channel 5, the first container 7, the second container 8, the inlet port 9, and the outlet port 10 are similar to the second embodiment, descriptions of them are omitted.

The hydro-desulfurizer 3A is placed closer to the inlet port 9 of the second container 8 than the ejector 2 is.

The temperature appropriate for hydrogenation reaction in the hydro-desulfurizer 3A is higher than the temperature required for decreasing the amount of condensed water in hydrogen-containing gas in the ejector 2. For example, when a Cu—Zn catalyst is used as the hydro-desulfurizing agent, the temperature range for effective operation of the hydro-desulfurizer 3A is about 150° C. to 350° C.

As exhaust gas of high temperature from the fuel cell unit 4 enters the second container 8 from the inlet port 9 of the second container 8, by placing the hydro-desulfurizer 3A closer to the inlet port 9 of the second container 8 than the ejector 2 is, the temperature in the hydro-desulfurizer 3A can be appropriately increased while decreasing the amount of condensed water in the ejector 2.

(Third Embodiment)
[Device Structure]

Figure 5:
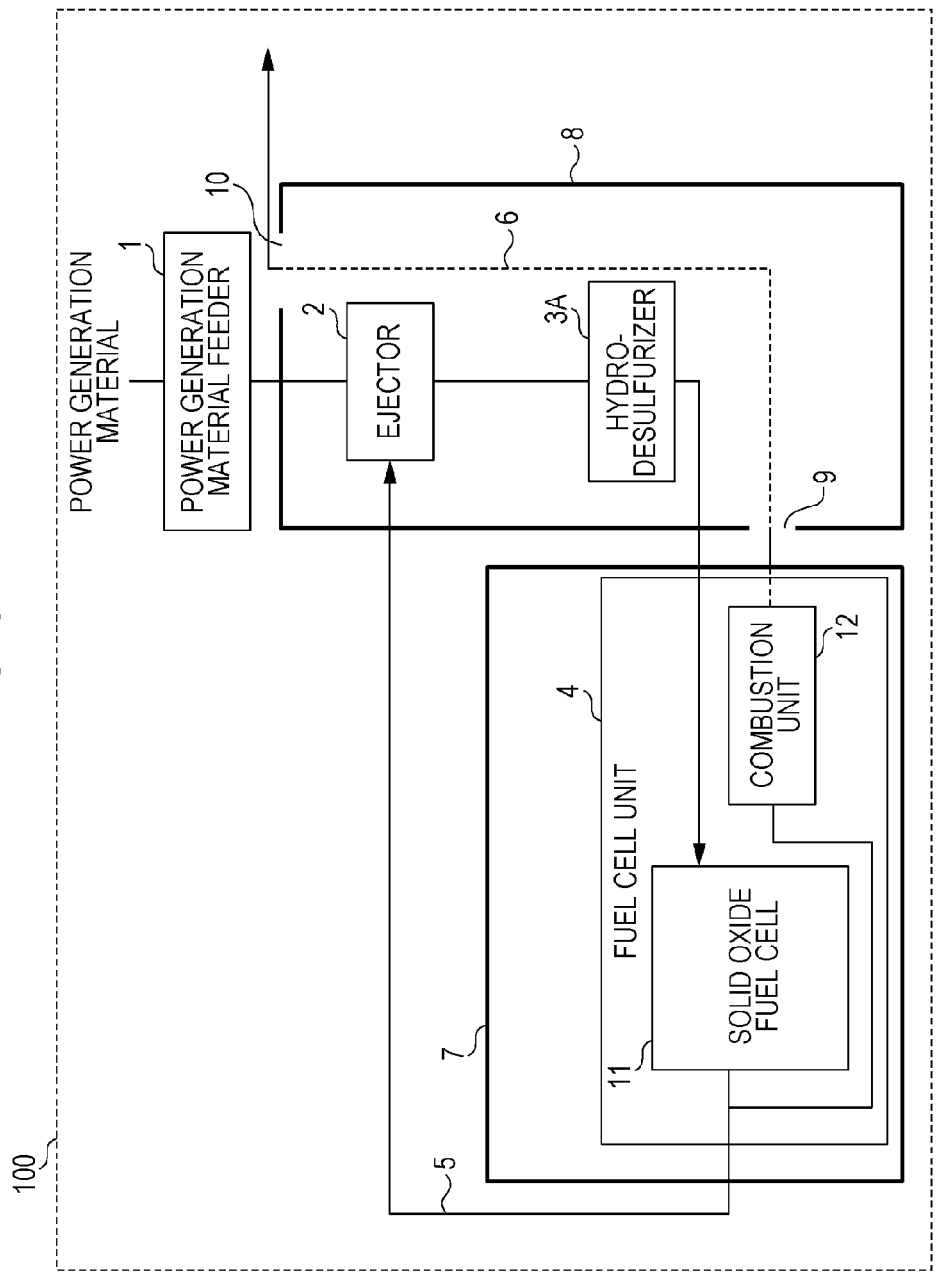
FIG. 5 illustrates an example of the fuel cell system according to a third embodiment.

FIG. 5 illustrates an example of the fuel cell system in a third embodiment.

As illustrated in FIG. 5, the fuel cell system 100 in this embodiment includes the power generation material feeder 1, the ejector 2, the hydro-desulfurizer 3A, the fuel cell unit 4, the recycle channel 5, the first container 7, the second container 8, the inlet port 9, and the outlet port 10. As the power generation material feeder 1, the ejector 2, the fuel cell unit 4, the recycle channel 5, the first container 7, the second container 8, the inlet port 9, and the outlet port 10 are similar to the first variation of the second embodiment, descriptions of them are omitted.

The fuel cell unit 4 includes solid oxide fuel cells 11 and a combustion unit 12 that combusts anode off-gas discharged from the solid oxide fuel cells 11. The solid oxide fuel cells 11 and the combustion unit 12 are housed in a casing (not shown). The casing is covered by the first container 7. A heat dissipation inhibiting component for suppressing heat dissipation from the casing may be provided between the casing and the first container 7. The heat dissipation inhibiting component may be heat insulating material, for example.

Except for the foregoing, the fuel cell system in this embodiment may have a similar structure to the fuel cell system in any of the first embodiment, the first and second variations of the first embodiment, the second embodiment, and the first to third variations of the second embodiment.

(Fourth Embodiment)
[Device Structure]

Figure 6:
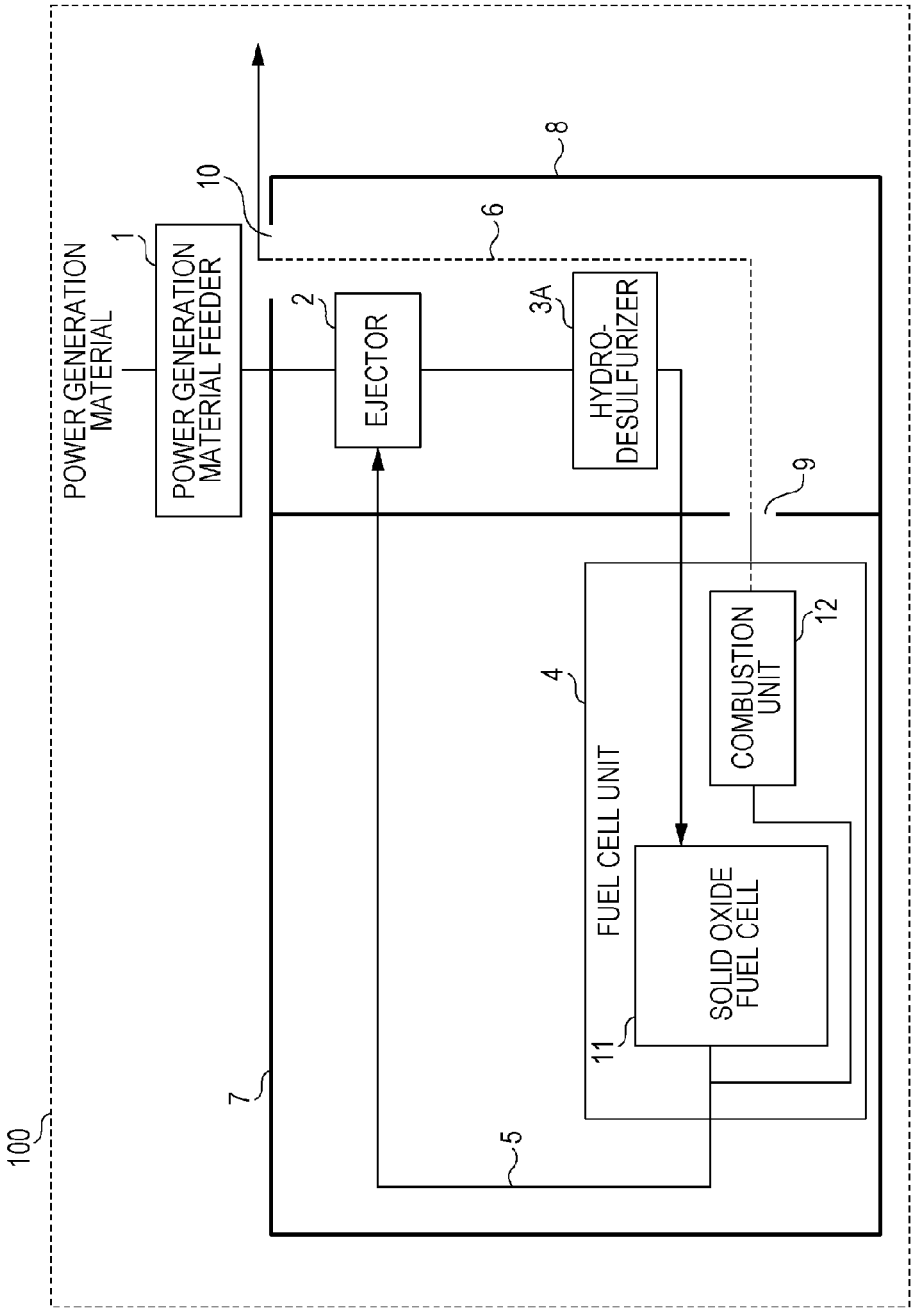
FIG. 6 illustrates an example of the fuel cell system according to a fourth embodiment.

FIG. 6 illustrates an example of the fuel cell system in the fourth embodiment.

As illustrated in FIG. 6, the fuel cell system in this embodiment includes the power generation material feeder 1, the ejector 2, the hydro-desulfurizer 3A, the fuel cell unit 4, the recycle channel 5, the first container 7, the second container 8, the inlet port 9, the outlet port 10, the solid oxide fuel cells 11, and the combustion unit 12. As the power generation material feeder 1, the ejector 2, the fuel cell unit 4, recycle channel 5, the first container 7, the second container 8, the inlet port 9, the outlet port 10, the solid oxide fuel cells 11, and the combustion unit 12 are similar to the third embodiment, descriptions of them are omitted.

The first container 7 and the second container 8 are rectangular parallelepipeds and disposed adjacent to each other. The recycle channel 5 extends from the first container 7 into the second container 8 via the adjacent surfaces of the first container 7 and the second container 8.

Except for the foregoing, the fuel cell system in this embodiment may have a similar structure to the fuel cell system in any of the first embodiment, the first and second variations of the first embodiment, the second embodiment, the first to third variations of the second embodiment, and the third embodiment.

An aspect of the present disclosure can reduce the possibility of the ejector being blocked by condensed water in hydrogen-containing gas from the recycle channel compared to conventional arts. Thus, an aspect of the present disclosure is applicable to a fuel cell system, for example.

What is claimed is:
1. A fuel cell system comprising:
   a hydro-desulfurizer that removes sulfur compounds in power generation material;
   a fuel cell unit including solid oxide fuel cells that generates electric power using the power generation material;

a recycle channel that supplies a part of hydrogen-containing gas from the fuel cell unit to the power generation material before the power generation material enters the hydro-desulfurizer;

an ejector which is provided in a power generation material channel upstream of the hydro-desulfurizer and into which the hydrogen-containing gas from the recycle channel flows;

a first container that houses the fuel cell unit;

a second container that houses the ejector; and a combustor that combusts anode off-gas discharged from the solid oxide fuel cells, the combustor discharging combustion exhaust gas, wherein the second container has an inlet port through which the combustion exhaust gas discharged from the first container enters the second container and an outlet port through which the combustion exhaust gas exits the second container, and wherein the ejector is heated directly by the combustion exhaust gas flowing between the inlet port and the outlet port.

2. The fuel cell system according to claim 1, wherein the hydro-desulfurizer is heated by the combustion exhaust gas.

3. The fuel cell system according to claim 1, wherein the hydro-desulfurizer is heated by the combustion exhaust gas flowing between the inlet port and the outlet port.

4. The fuel cell system according to claim 2, wherein the hydro-desulfurizer is heated by the combustion exhaust gas upstream of the ejector.

5. The fuel cell system according to claim 3, wherein the hydro-desulfurizer is placed closer to the inlet port than the ejector is.

6. The fuel cell system according to claim 1, wherein the first container and the second container are rectangular parallelepipeds and disposed adjacent to each other, and wherein the recycle channel extends from the first container into the second container via adjacent surfaces of the first container and the second container.

* * * * *